Nov. 13, 1928.   1,691,747
H. WEICHSEL ET AL
ALTERNATING CURRENT MOTOR
Filed Jan. 14, 1926
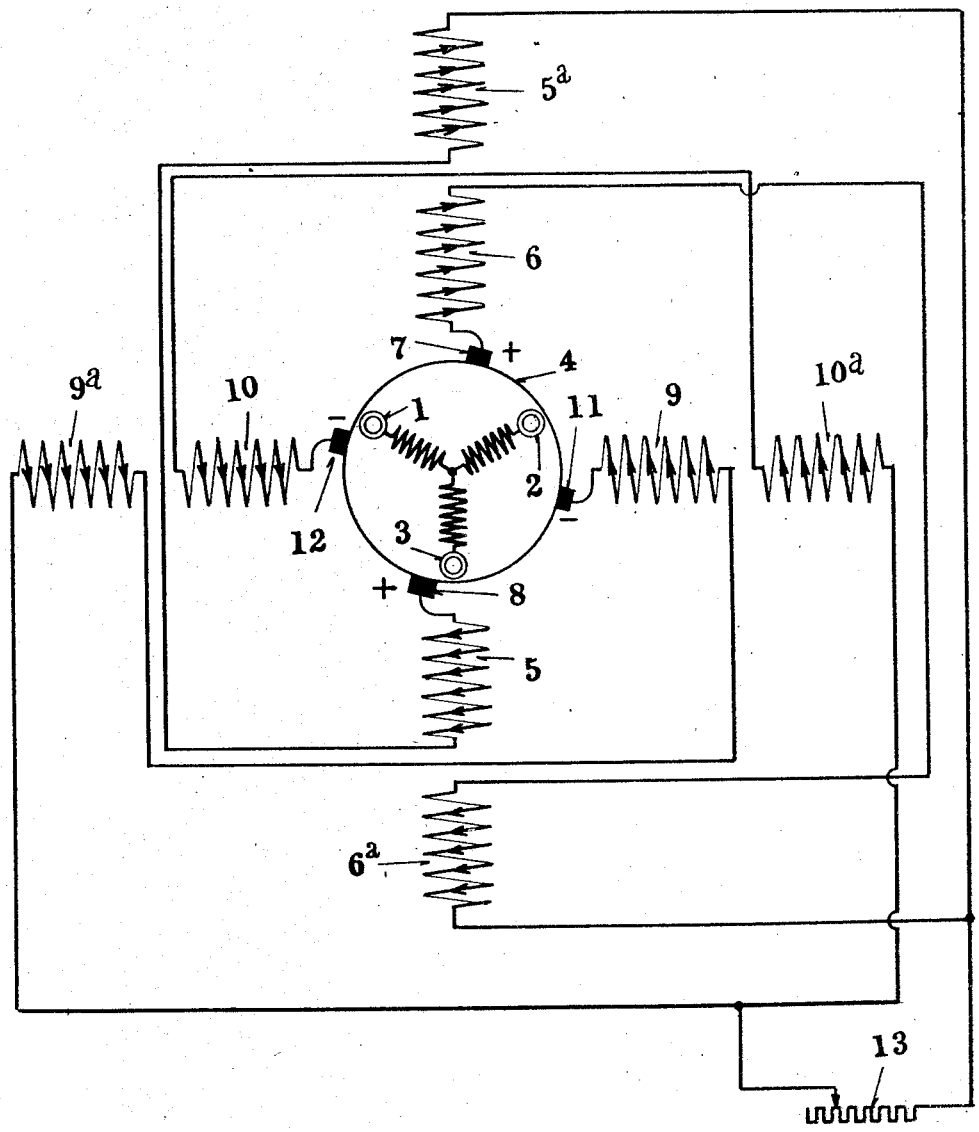

Patented Nov. 13, 1928.

1,691,747

UNITED STATES PATENT OFFICE.

HANS WEICHSEL AND BRADLEY McCORMICK, OF ST. LOUIS, MISSOURI, ASSIGNORS TO WAGNER ELECTRIC CORPORATION, OF ST. LOUIS, MISSOURI, A CORPORATION OF DELAWARE.

ALTERNATING-CURRENT MOTOR.

Application filed January 14, 1926. Serial No. 81,179.

This invention relates to means for suppressing or reducing sparking at the brushes in single and polyphase commutator motors and in the diagrammatic drawing forming a part hereof, is shown in application to a synchronous induction motor of the type described in United States Patent No. 1,553,345 issued September 15, 1925.

Referring to the drawing, the primary or inducing member of the four-pole machine is provided with a polyphase winding connected to slip rings 1, 2, 3, and with a commuted winding 4. The stator has exciting windings 5, 5ª, 6, 6ª, which windings are connected to brushes 7, 8 of like polarity, and also exciting windings 9, 9ª, 10 and 10ª connected to brushes 11, 12 of opposite polarity from brushes 7, 8. The brushes are slightly displaced from the axes of the windings for the reasons explained in Patent No. 1,553,345 above referred to, and the brushes of like polarity are preferably located 180 mechanical degrees apart. It will be noted that each pole of the machine carries two exciting windings, each in circuit with brushes of like polarity but not directly connected to the same brush. Adjustable resistance 13 is located in the circuit connecting the groups of windings which are directly connected respectively to the positive and negative brushes.

Referring to the operation of the machine, imperfect contact, or breaking of contact between the brush and the commutator, due to high segments, high mica, or other well known causes, tends to result in the production of E. M. F.'s of self induction causing sparking between the brushes and the commutator but the magnitude of these self induced E. M. F.'s is very greatly minimized in the machine described in that the windings on each pole of the machine are in good inductive relation to each other, and that if, for example, brush 7 should leave the commutator, windings 5ª and 5, which are in good inductive relation to the windings 6ª and 6, and whose circuit would normally remain closed in that it would seldom happen that brush 8 would leave the commutator at the same time as brush 7, windings 5 and 5ª will act as damping windings preventing the building up of self induced potential in the windings 6 and 6ª.

While it will be understood that we have illustrated the preferred embodiment of our invention, its fundamental principle is based upon the provision of means in inductive relation to a brush circuit to suppress self induced potentials in that circuit whether these means are located on a stator pole of the machine or not.

The sub-division of the exciting windings and their distribution over more than one pole also results in an even distribution of ampere turns on the stator at all times even though the contact resistance at one of the brushes differs from that at the others.

Having fully described our invention, what we claim as new and desire to secure by United States Letters Patent is:

1. In an alternating current motor, the combination of an inducing member provided with a commutator and brushes, an induced member provided with a plurality of exciting windings adapted to produce an N-pole magnetization of more than two poles, each pole of the machine being provided with two exciting windings in good inductive relation to each other, said windings being connected to commutator brushes to magnetize in the same direction but not connected in series with the same set of brushes, and an adjustable resistance arranged to connect the exciting windings which are directly connected to brushes of positive polarity in circuit with the exciting windings which are directly connected with brushes of negative polarity.

2. In an alternating current motor, the combination of an inducing member provided with a commutator and brushes, and an induced member provided with a plurality of exciting windings adapted to produce N-pole magnetization of more than two poles, each pole of the machine being provided with two exciting windings in good inductive relation to each other and connections between the commutator brushes and exciting windings so arranged that the exciting circuits have a common point to which each brush is connected through at least one winding, the windings on each pole being connected to different brushes but brushes of like polarity and said windings being arranged to magnetize in the same direction.

In testimony whereof, we hereunto affix our signatures, this 8th day of January, 1926.

HANS WEICHSEL.
BRADLEY McCORMICK.